United States Patent
Liao et al.

(10) Patent No.: US 9,223,341 B2
(45) Date of Patent: Dec. 29, 2015

(54) HINGE ASSEMBLY HAVING LINEAR MOVEMENT AND SLIDE TYPE ELECTRONIC DEVICE

(75) Inventors: Chien-Jung Liao, New Taipei (TW); Yao-Ting Lee, New Taipei (TW); Ming-Hsi Lee, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 467 days.

(21) Appl. No.: 13/472,023

(22) Filed: May 15, 2012

(65) Prior Publication Data

US 2013/0176663 A1 Jul. 11, 2013

(30) Foreign Application Priority Data

Jan. 9, 2012 (TW) .............................. 101100826 A

(51) Int. Cl.
*G06F 1/16* (2006.01)
*G06F 3/02* (2006.01)
*H04M 1/00* (2006.01)

(52) U.S. Cl.
CPC ............ *G06F 1/1616* (2013.01); *G06F 1/1624* (2013.01); *G06F 1/1681* (2013.01); *Y10T 16/5377* (2015.01); *Y10T 16/5453* (2015.01)

(58) Field of Classification Search
CPC ... G06F 1/1624; G06F 1/1616; G06F 1/1626; G06F 1/1633; G06F 1/1681
USPC ............. 361/679.01–679.45, 679.55–679.59; 455/575.1, 575.3, 575.4; 345/156, 157, 345/168, 169, 905
See application file for complete search history.

(56) References Cited

U.S. PATENT DOCUMENTS

| | | | |
|---|---|---|---|
| 7,848,111 B2 | 12/2010 | Tsai et al. | |
| 8,081,449 B2 * | 12/2011 | Lin et al. | 361/679.56 |
| 8,199,475 B2 * | 6/2012 | Yeh et al. | 361/679.27 |
| 8,213,163 B2 * | 7/2012 | Wu et al. | 361/679.01 |

(Continued)

FOREIGN PATENT DOCUMENTS

| | | |
|---|---|---|
| CN | 201123017 Y | 9/2008 |
| CN | 101465890 A | 6/2009 |

(Continued)

OTHER PUBLICATIONS

Taiwan Patent Office, Office Action, Patent Application No. TW101100826, Oct. 15, 2014, Taiwan.

(Continued)

*Primary Examiner* — Nidhi Thaker
(74) *Attorney, Agent, or Firm* — Rabin & Berdo, PC

(57) ABSTRACT

A hinge assembly includes a guiding rail, at least one protruding block, a slidable element, and a rotatable element. The guiding rail includes a first side and a second side surface opposite to each other. The guiding rail further includes a first edge and a second edge in parallel to a longitudinal direction of the guiding rail. The protruding block is disposed on the first side surface. The width of the protruding block is smaller than that of the first side surface, and a gap exists between the protruding block and the first edge. The slidable element includes a sliding surface and a guiding surface opposite to each other. The first edge of the guiding rail inserts into a chute formed on the sliding surface to move the slidable element along the first edge. The rotatable element is pivoted to the slidable element to rotate on the slidable element.

21 Claims, 13 Drawing Sheets

(56) References Cited

U.S. PATENT DOCUMENTS

| | | | |
|---|---|---|---|
| 8,248,788 B2 * | 8/2012 | Wu et al. | 361/679.55 |
| 8,248,789 B2 * | 8/2012 | Wu et al. | 361/679.56 |
| 8,537,542 B2 * | 9/2013 | Chen et al. | 361/679.55 |
| 8,605,430 B2 * | 12/2013 | Chen et al. | 361/679.55 |
| 8,908,364 B2 * | 12/2014 | Tseng et al. | 361/679.26 |
| 2008/0304215 A1 * | 12/2008 | Chiu | 361/681 |
| 2010/0118487 A1 * | 5/2010 | Ou et al. | 361/679.55 |
| 2010/0323770 A1 * | 12/2010 | Chuang et al. | 455/575.4 |
| 2011/0157793 A1 | 6/2011 | Ma et al. | |

FOREIGN PATENT DOCUMENTS

| | | | |
|---|---|---|---|
| TW | 408221 U | * | 7/2011 |
| TW | M408221 | * | 7/2011 |
| TW | M408221 U | | 7/2011 |

OTHER PUBLICATIONS

China Patent Office, Office Action, Patent Application No. 201210019156.5, Oct. 20, 2015, China.

* cited by examiner

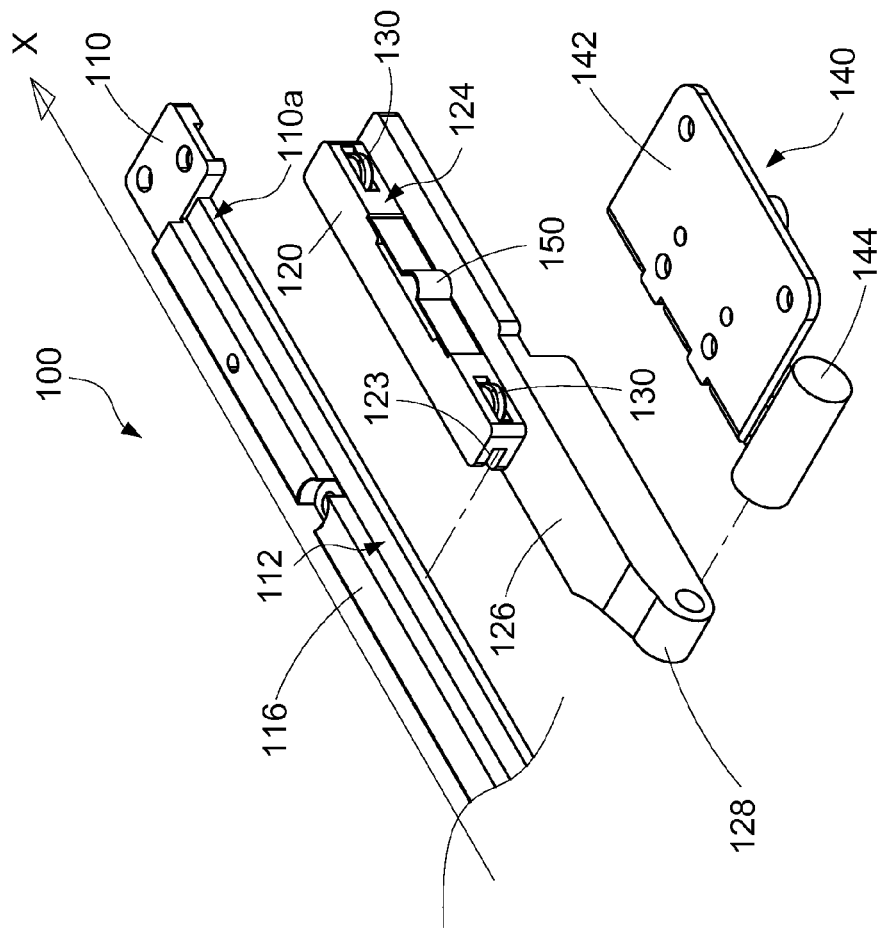
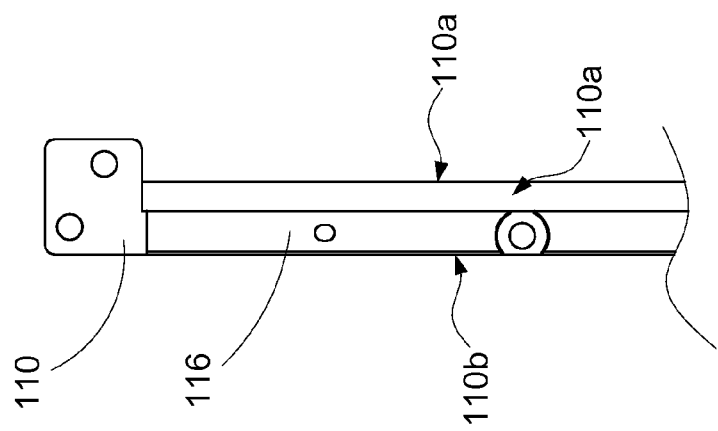

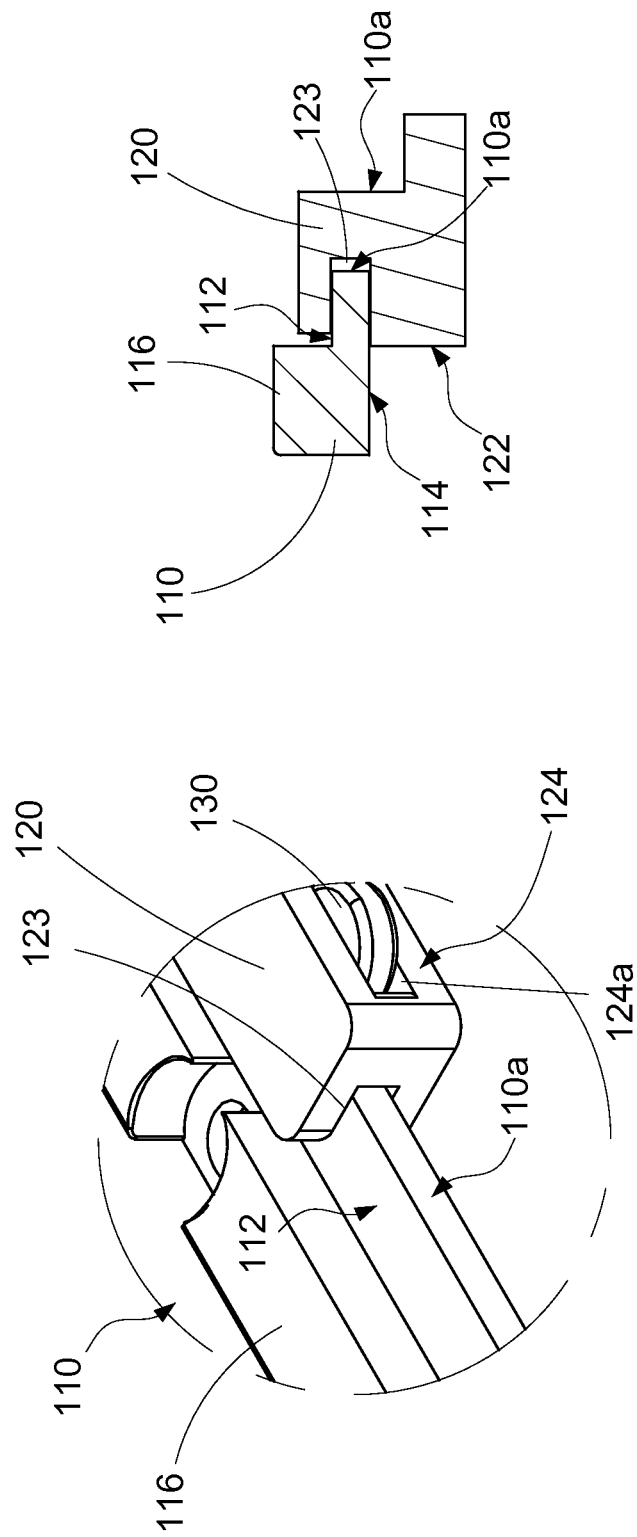

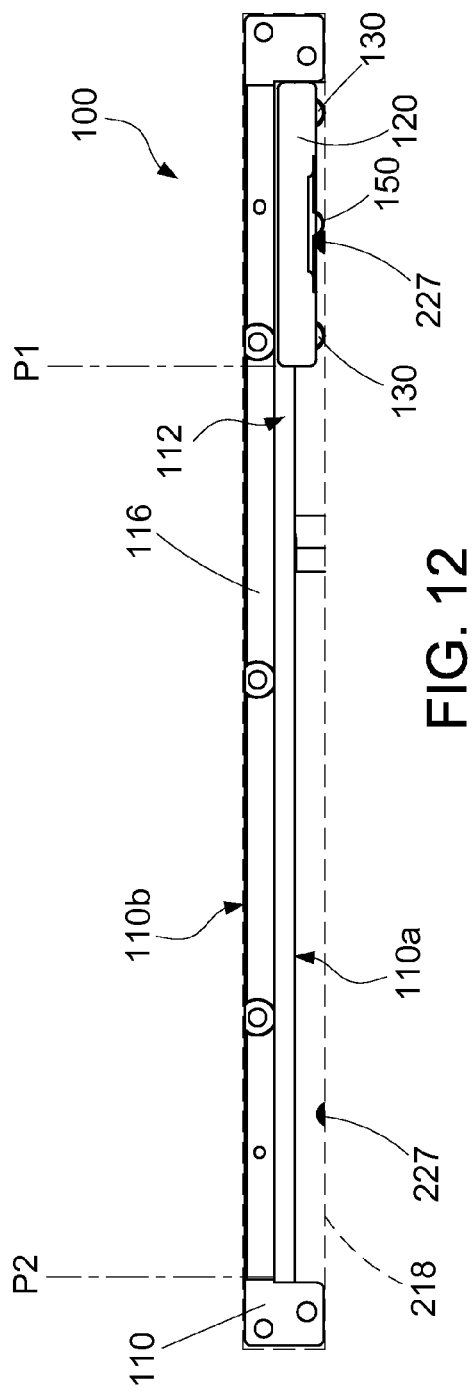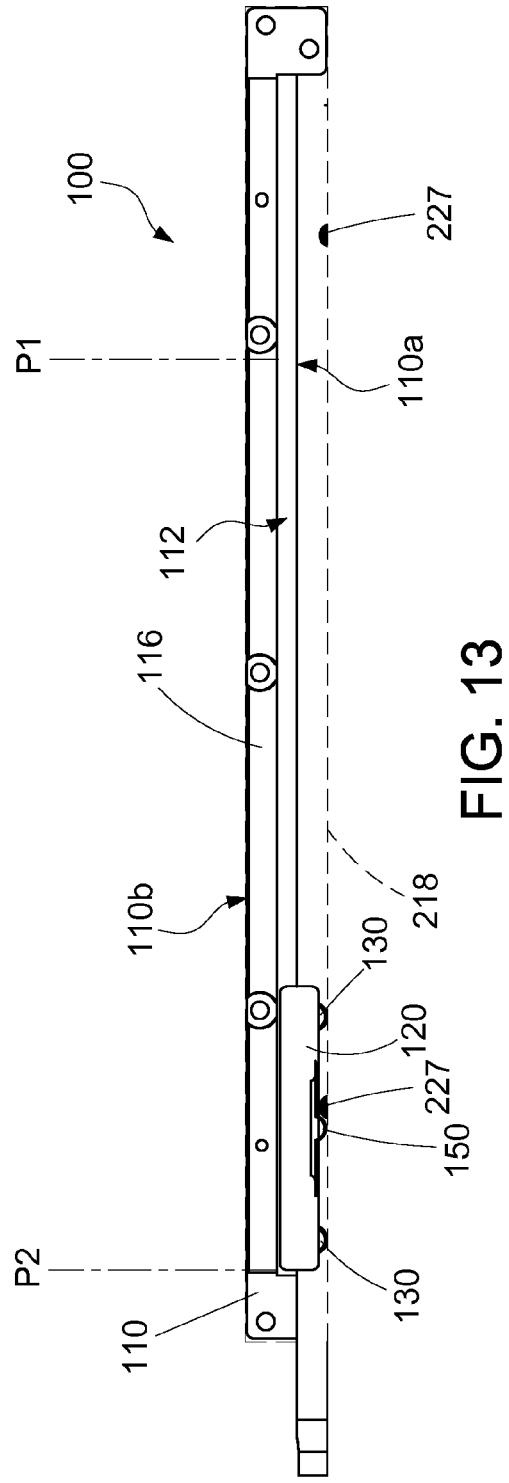

HINGE ASSEMBLY HAVING LINEAR MOVEMENT AND SLIDE TYPE ELECTRONIC DEVICE

CROSS-REFERENCES TO RELATED APPLICATIONS

This non-provisional application claims priority under 35 U.S.C. §119(a) on Patent Application No. 101100826 filed in Taiwan, R.O.C. on 2012/01/09, the entire contents of which are hereby incorporated by reference.

BACKGROUND

1. Technical Field

This disclosure us relates to a hinge assembly, and more particular to a hinge assembly having linear and rotational movements and a slide-type electronic device having the hinge assembly.

2. Related Art

A slide-type electronic device in the art includes a cover-body and a main-body. The cover-body is combined with the main-body in a slidable manner. Usually, the cover-body can only moves linearly on the main-body. In the art, a fold-type electronic device also includes a cover-body and a main-body. The cover-body is pivoted to the main-body, such that the cover-body can rotate on the main-body to form an included angle between the cover-body and the main-body. A slide-type electronic device having linear and rotational movements is also proposed. For example, in U.S. Pat. No. 7,848,111, a slide-type electronic device having linear and rotational movements is disclosed.

In U.S. Pat. No. 7,848,111, the first body and the second body are combined with a hinge assembly having linear movement. To achieve linear and rotational movements, such a hinge assembly has complicate structure. Meanwhile, when the cover-body slides on the main-body, the gap between the cover-body and the main-body has to be made as small as possible. Therefore, in the aforementioned hinge assembly, at least part of the components has to be pre-installed into the cover-body and the main-body. After the main assembling processes of the cover-body and the main-body are finished, those components composed the hinge assembly are combined to combine the cover-body with the main-body. An example of slide-type electronic device is disclosed in US 2011/0157793 A1, in which the slide-type electronic device includes many components which have to be pre-installed into the cover-body or the main-body.

Since some components have to be pre-installed into the cover-body or the main-body, the assembling process for the slide-type electronic device is complicated and the internal structures of the cover-body and the second body are also complicated.

SUMMARY

In the art, the assembling process for the slide-type electronic device is complicate. Accordingly, this disclosure proposes a hinge assembly having linear movement which is simple in structure to simplify the assembling process of the slide-type electronic device.

Accordingly, this disclosure is directed to propose a hinge assembly having linear movement, which includes a guiding rail, at least one protruding block, a slidable element, and a rotatable element. The guiding rail includes a first side surface and a second side surface opposite to each other. The guiding rail further includes a first edge and a second edge opposite to each other and in parallel to the longitudinal direction of the guiding rail. The protruding block is disposed on the first side surface. The width of the protruding block is smaller than the width of the first side surface, such that a gap exists between the protruding block and the first edge. The slidable element includes a sliding surface and a guiding surface opposite to each other. A chute is formed on the sliding surface. The chute has two open ends and first edge of the guiding rail inserts into the chute, such that the slidable element is capable to slide along the first edge.

Through the combination of the guiding rail and the slidable element, the hinge assembly provides linear movement. Meanwhile, through the combination of the rotatable element and the slidable element, the hinge assembly provides rotational movement.

This disclosure is also directed to propose a slide-type electronic device, which includes a first body, a second body, and at least one hinge assembly. The first body includes a front surface and a back surface. The second body includes a top surface. The hinge assembly is provided for combining the first body with the second body.

The hinge assembly includes a guiding rail, at least one protruding block, a slidable element, and a rotatable element. The guiding rail is combined with first body. The guiding rail includes a first side surface and a second side surface opposite to each other, and the first side surface faces the first body and is spaced from the first body. The guiding rail further includes a first edge and a second edge opposite to each other and in parallel to a longitudinal direction of the guiding rail. The slidable element includes a sliding surface and a guiding surface opposite to each other. A chute having two open ends is formed on the sliding surface. The first edge of the guiding rail inserts into the chute, such that the slidable element is capable to slide along the first edge. The rotatable element is combined with the second body, and the rotatable element is pivoted to slidable element rotate on the slidable element.

The hinge assembly provides linear and rotational movements; therefore, the first body is not only capable to move linearly on the second body, but also capable to rotate relative the second body.

The structure of the hinge assembly proposed in this disclosure is simple, and is capable to be assembled outside the first body and the second body. Components of the hinge assembly proposed in this disclosure are not required to be pre-installed into the first body or the second body in advance, such that the assembling process for the slide-type electronic device is simplified.

BRIEF DESCRIPTION OF THE DRAWINGS

This disclosure will become more fully understood from the detailed description given herein below for illustration only and thus not limitative of this disclosure, wherein:

FIG. 2 is a partial top view of a guiding rail according to the first embodiment;

FIG. 3 is an exploded view of the hinge assembly according to the first embodiment;

FIG. 5 is a perspective view of the hinge assembly according to the first embodiment;

FIG. 6 is a cross-sectional view along A-A' in FIG. 1;

FIG. 12 and FIG. 13 are top views of the hinge assembly according to the first embodiment;

DETAILED DESCRIPTION

Figure 1:
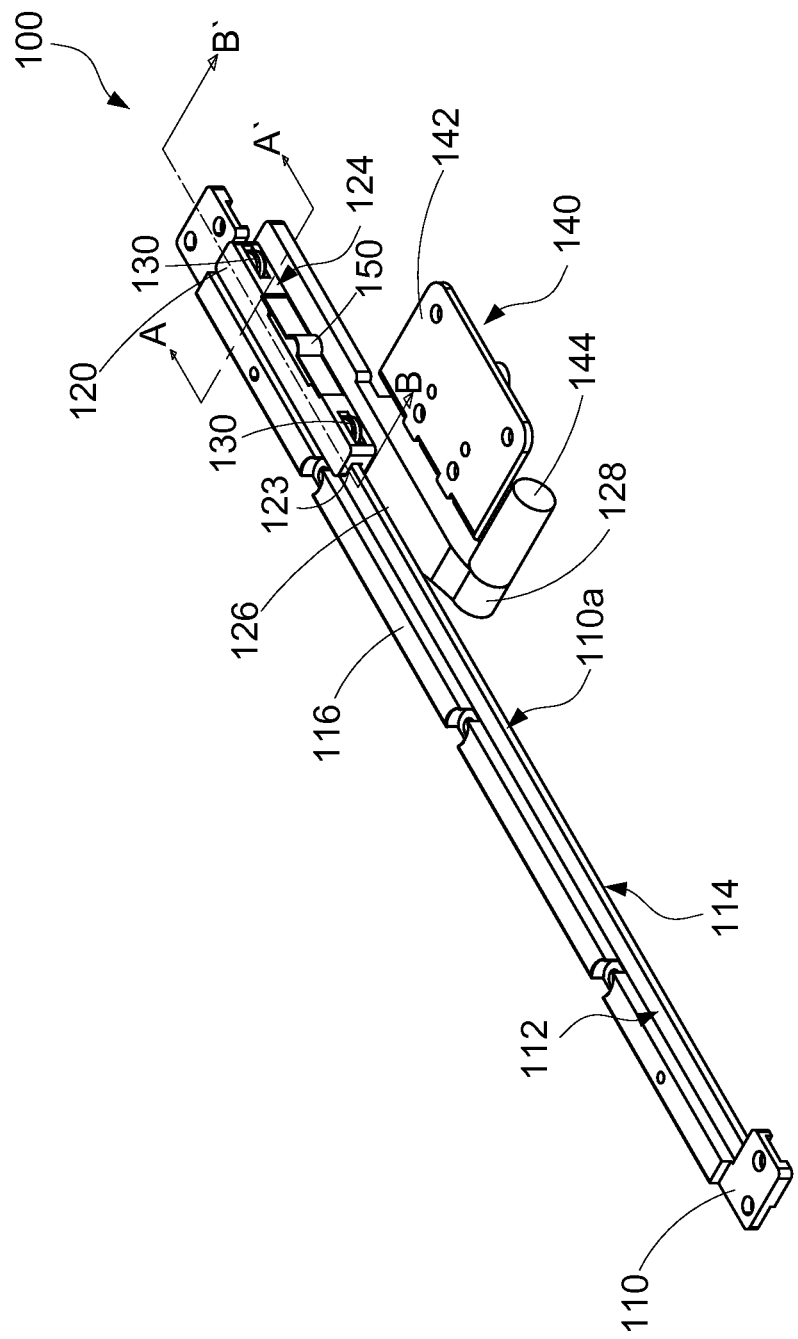
FIG. 1 is a perspective view of a hinge assembly according to a first embodiment.

Please refer to FIG. 1 and FIG. 2, in which a hinge assembly 100 having linear movement is shown. The hinge assembly 100 is adapted to connect a first article to a second article, such that the first article is not only capable to move linearly on the second article, but also capable to rotate on the second article. Usually, a pair of hinge assemblies 100 are utilized to connected the first article to the second article; however, utilizing one single hinge assembly 100 to connect the first article to the second article is not excluded according to this disclosure.

As shown in FIG. 1 and FIG. 2, the hinge assembly 100 includes a guiding rail 110, a slidable element 120, at least two main rolling members 130, and a rotatable element 140.

As shown in FIG. 2 and FIG. 3, the guiding rail 110 is provided to be combined with the first article. The guiding rail 110 includes a first side surface 112 and a second side surface 114 opposite to each other. The guiding rail 110 further includes a first edge 110a and a second edge 110b opposite to each other and in parallel to the longitudinal direction X of the guiding rail 110.

Under the circumstance that the guiding rail 110 is combined with the first article, the first side surface 112 faces the first article. In order to avoid the first side surface 112 from contacting with the first article directly, a plurality of protruding blocks 116 are disposed on the first side surface 112, in which the protruding blocks 116 are used to be combined with the first article. The width of each of the protruding blocks 116 is smaller than the width of the first side surface 112. And each protruding block 116 is disposed near the second edge 110b, such that a gap exists between the protruding block 116 and the first edge 110a.

As shown in FIG. 3, FIG. 4, FIG. 5, and FIG. 6, the slidable element 120 includes a sliding surface 122 and a guiding surface 124 opposite to each other. A chute 123 is formed on the sliding surface 122, in which the chute 123 has two open ends. The first edge 110a of the guiding rail 110 inserts the chute 123, such that the slidable element 120 is capable to slide along the first edge 110a.

The main rolling members 130 are combined with slidable element 120 in a rotatable manner. At least part of the each of the main rolling members 130 protrudes on the guiding surface 124; or at least part of each of the main rolling members 130 protrudes in to the chute 123. The slidable element 120 further includes an extension portion 126, and a pivotal seat 128 is disposed to the extension portion 126.

Figure 4:
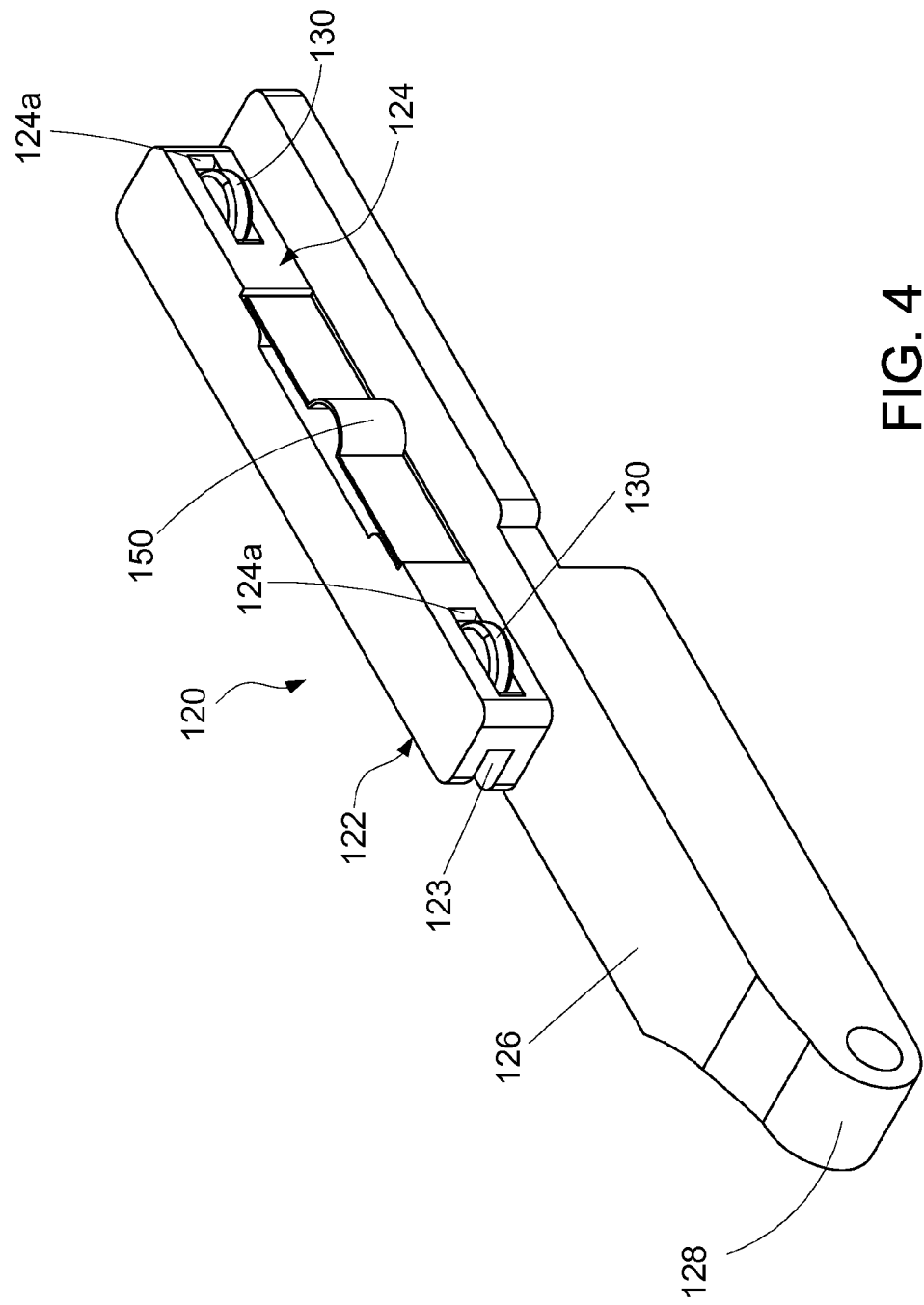
FIG. 4 is a perspective view of a slidable element according to the first embodiment.
Figure 7:
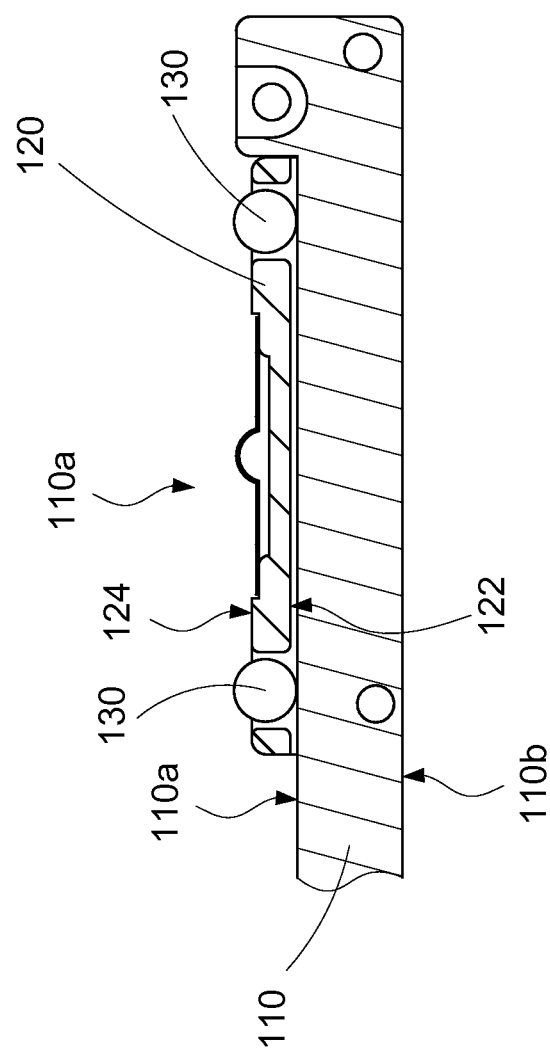
FIG. 7 is a cross-sectional view along B-B' in FIG. 1.

As shown in FIG. 4, FIG. 5, and FIG. 7, in one example, each of the main rolling members 130 is a roller, and a rotation axis of each roller is perpendicular to the first side surface 112. The main rolling members 130 are located inside the slidable element 120, and two opening 124a are formed on the guiding surface 124, such that the two main rolling members 130 protrude on the guiding surface 134 via the two openings 124a respectively. Meanwhile, at least part of each of the main rolling members 130 protrudes into the chute 123 to contact with the first edge 110a of the guiding rail 110. In another example, each of the main rolling members 130 protrudes on the sliding surface 122 without any part located in the chute 123, and the main rolling members 130 contact with the other part of the guiding rail 110.

As shown in FIG. 4, in one example, the hinge assembly 100 further includes a positioning member 150 disposed on the guiding surface 124 in a protruding manner. The positioning member 150 is a bent reed and disposed on the guiding surface 124, and the bent part of the reed protrudes on the guiding surface 124.

Figure 8:
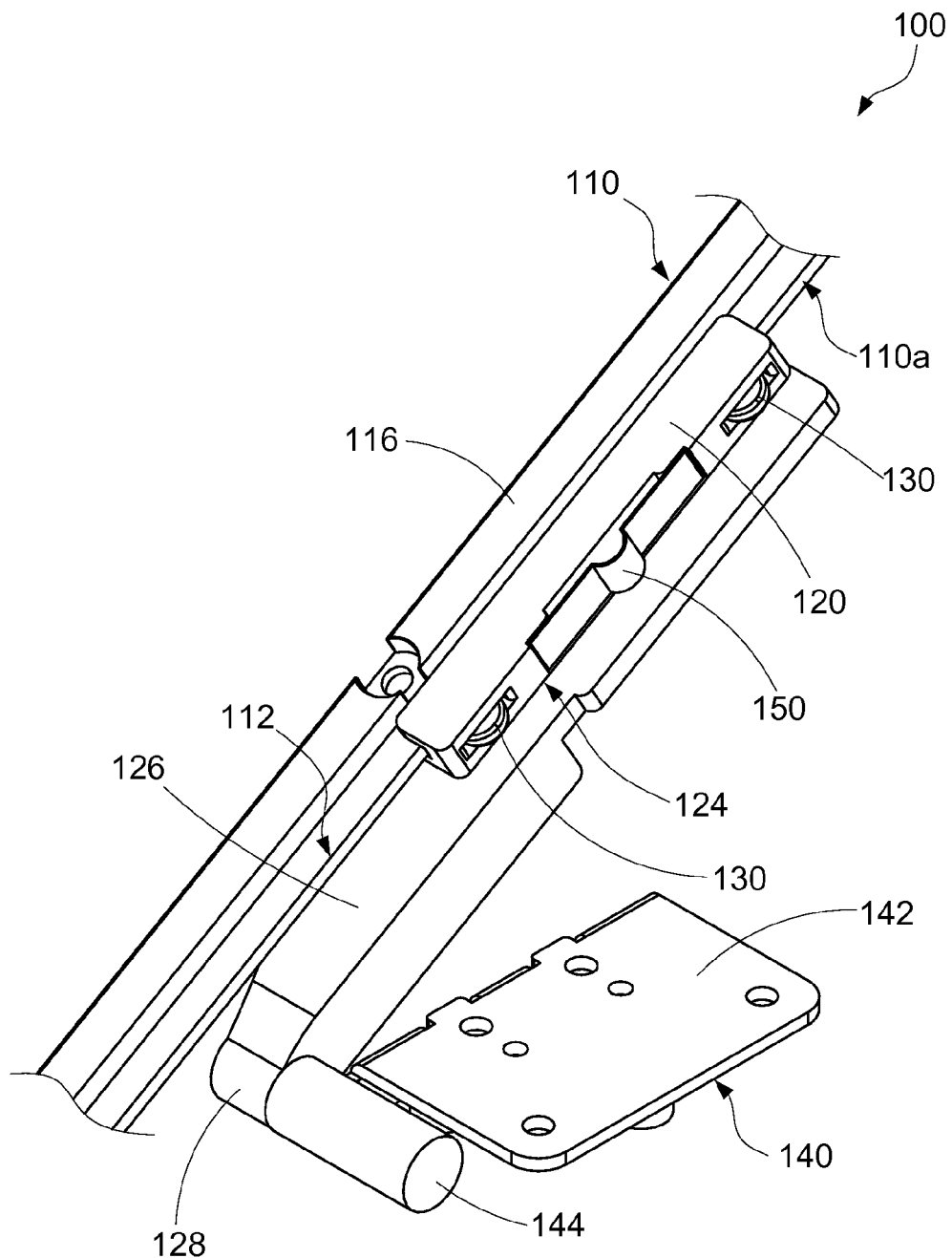
FIG. 8 is a perspective view of the slide-type electronic device according to the first embodiment.

As shown in FIG. 8, the rotatable element 140 is used to be combined with the second article, and the rotatable element 140 is pivoted to the slidable element 120 to rotate on the slidable element 120. The rotatable element 140 includes a fixing piece 142 and a rotation shaft 144. The fixing piece 142 is combined with the second article. The rotation shaft 144 is disposed on the fixing piece 142, and pivoted to the pivotal seat 128 of the slidable element 120. Through the slidable element 120 slides on the guiding rail 110, the first article is capable to move linearly on the second article. Through the rotatable element 140 rotates on the slidable element 120, the first article is capable to rotate on the second article.

Figure 9:
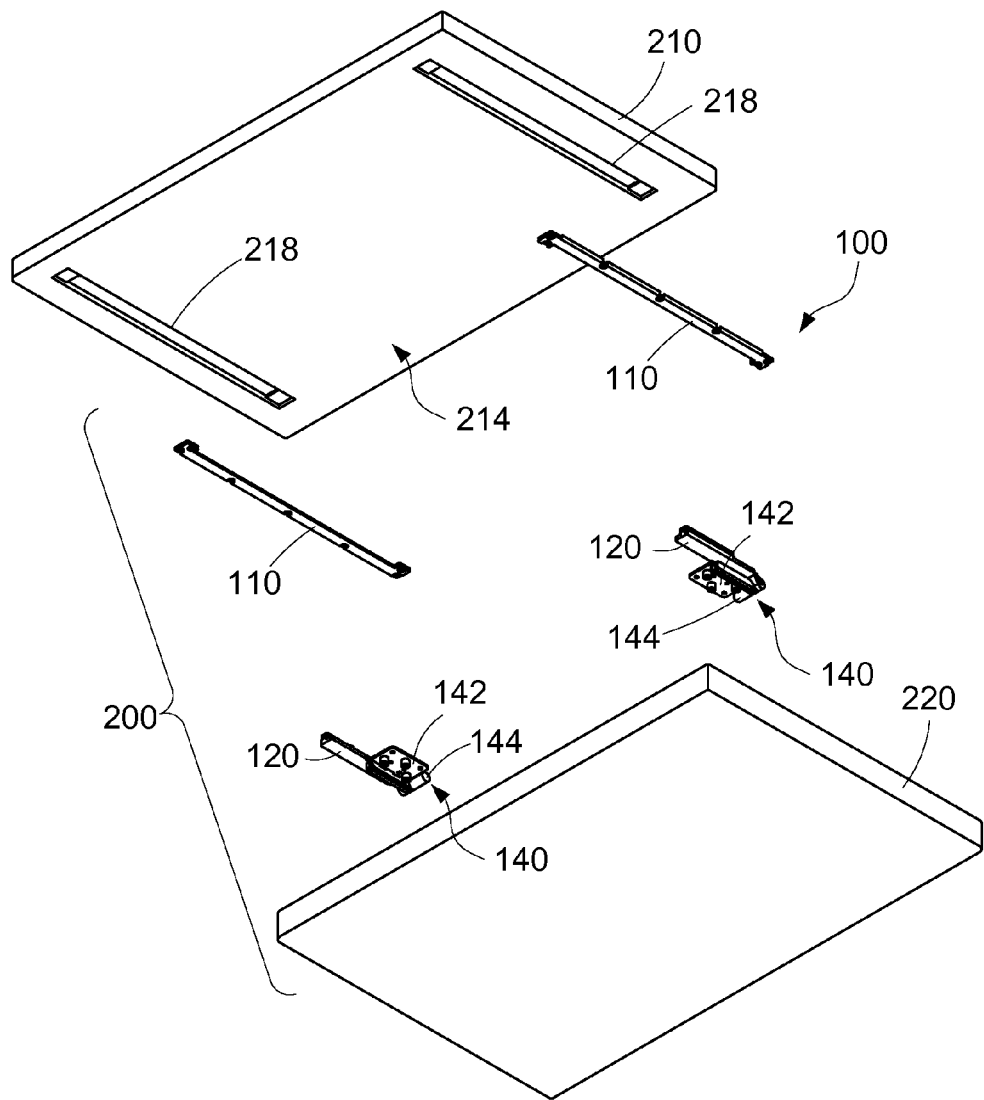
FIG. 9 and FIG. 10 are exploded views of the slide-type electronic device according to the first embodiment.
Figure 10:
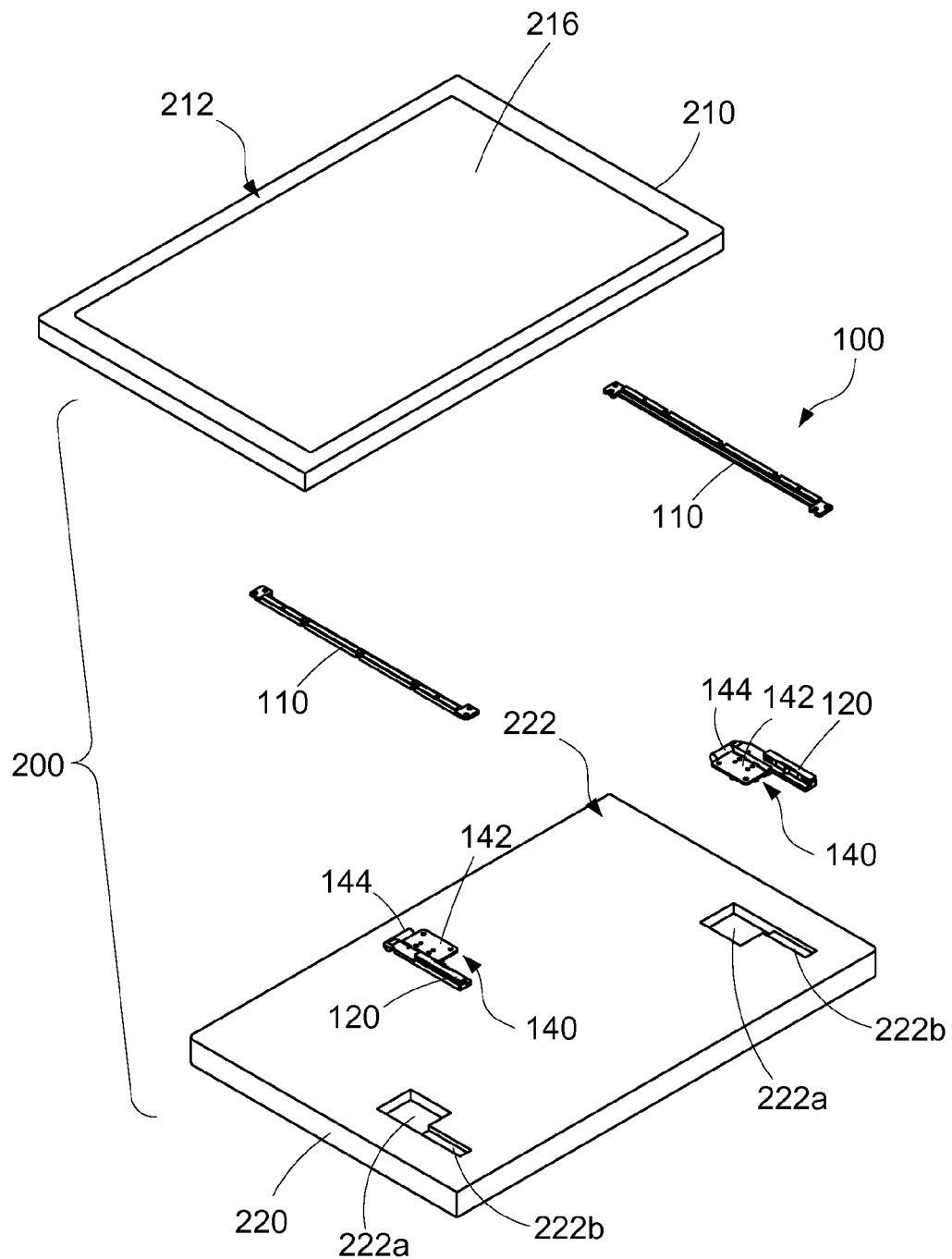

Please refer to FIG. 9 and FIG. 10, in which a slide-type electronic device 200 according to a first embodiment is shown. The slide-type electronic device 200 includes a first body 210, a second body 220, and at least one pairs of hinge assemblies 100. The first body 210 and the second body 220 hereinafter are the aforementioned first article and second article. The amount of the hinge assemblies 100 is not restricted, and a pair of hinge assemblies 100 is taken as illustrations in this embodiment.

As shown in FIG. 9 and FIG. 10, the first body 210 includes a front surface 212 and a back surface 214. The second body 220 includes a top surface 222.

As shown in FIG. 9 and FIG. 10, a display screen 216 is disposed on the front surface 121. In at least one example, the display screen 216 is disposed on the second body 220. each of the hinge assemblies 100 is provided for combining the first body 210 with the second body 220, such that the first body 210 is capable to move linearly and rotate on the second body 220, wherein the first body 210 is disposed on the top surface 222 of the second body 220 in a slidable manner and the back surface 214 faces the top surface 222 of the second body 22.

Figure 11:
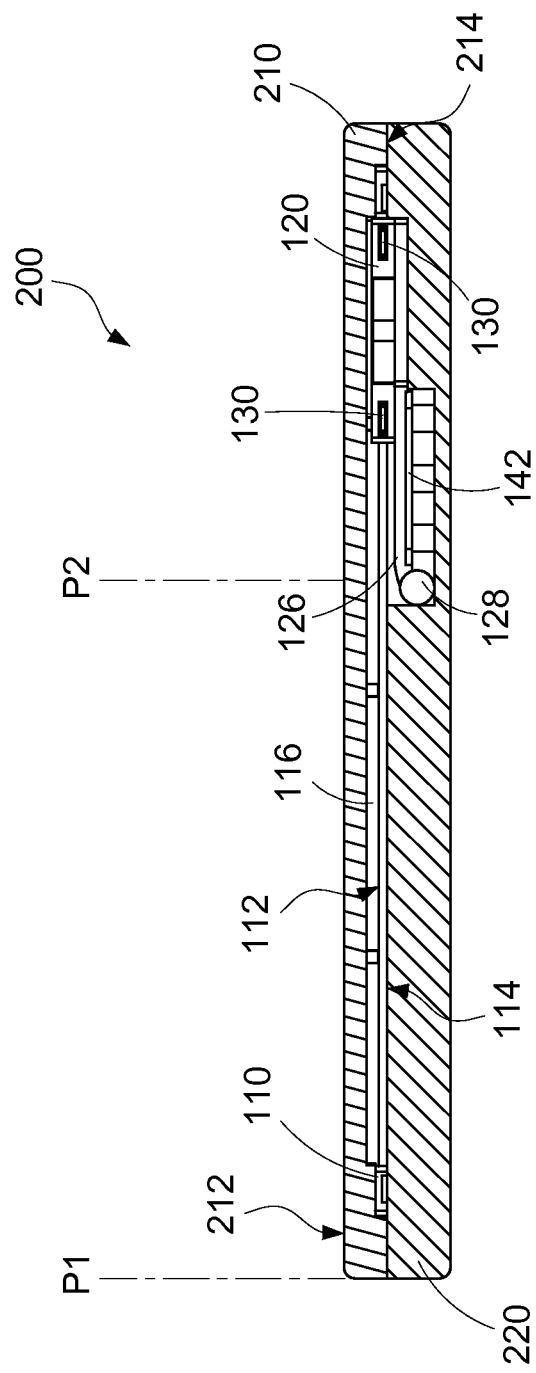
FIG. 11 is cross-sectional view of the slide-type electronic device according to the first embodiment.
Figure 14:
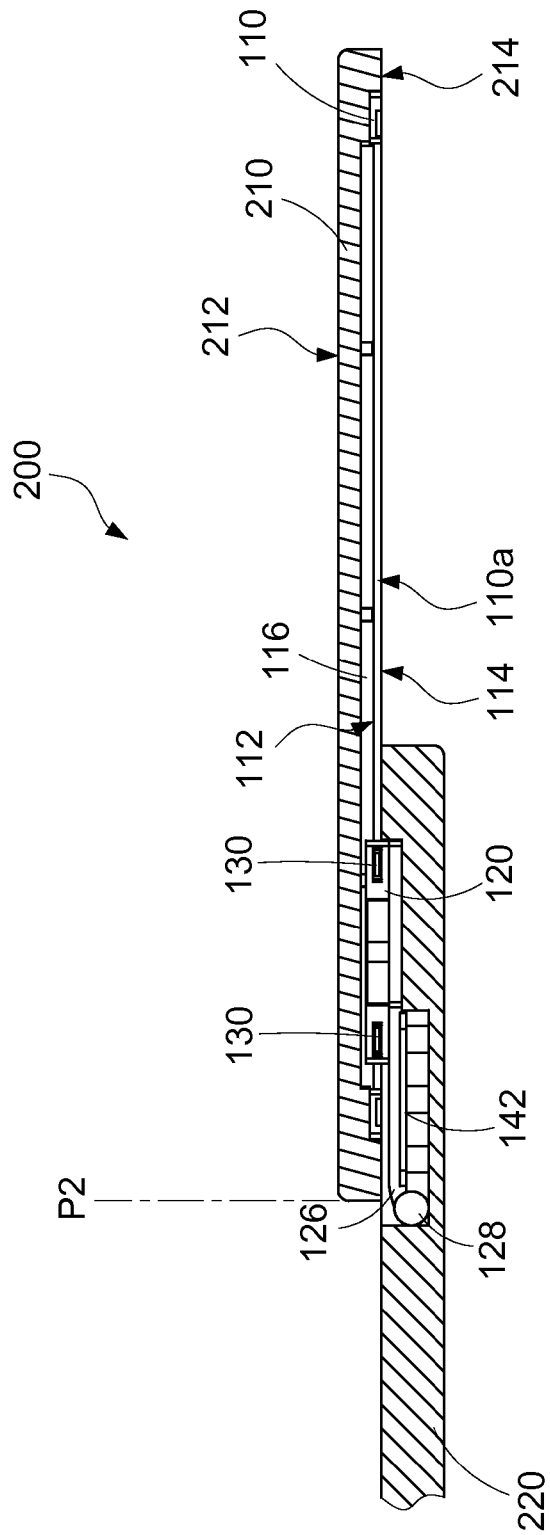
FIG. 14 and FIG. 15 are cross-sectional views of the slide-type electronic device according to the first embodiment.

As shown in FIG. 9, FIG. 10, and FIG. 11, the guiding rail 110 of each hinge assembly 100 is combined with the first body 210. Two elongated slots 218 are formed on the back surface 214 of the first body 210. The elongated slots 218 are parallel to each other. Each of the elongated slots 218 is used to receive one of the guiding rails 110. The first side surface 112 of each guiding rail 110 faces the first body 210. Each protruding block 116 is combined with the first body 210, such that the first side surface 112 is spaced from the first body 210.

As shown in FIG. 12 and FIG. 13, the width if each guiding rail 110 is smaller than the width of the corresponding elongated slot 218, and a gap exists between the first edge 110a and an edge of the elongated slot 218, wherein the gap is used for the slidable element 120 to slide therein and the slidable element 120 partially protrudes on the first body 210. Furthermore, the extension portion 126 is located outside the first body 210.

As shown in FIG. 7, FIG. 12, and FIG. 13, each main rolling member 130 contacts with and rolls on the first edge 110a of the corresponding guiding rail 110 to reduce frictional force between the main rolling member 130 the guiding rail 110; or each main rolling member 130 contacts with and rolls on an inner wall of the elongated slot 218, so as to reduce frictional force between the main rolling member 130 and the inner wall. Two or more main rolling members 130 can prevent the slidable element 120 from being biased away from the moving direction and partially contacting with the inner wall and/or the guiding rail 110.

As shown in FIG. 9, FIG. 10, and FIG. 11, the rotatable element 140 of each hinge assembly 100 is combined with the second body 220. Two first troughs 222a and two second troughs 222b are formed on the top surface 222 of second body 220. Each second trough 222b is communicated with one of the first troughs 222a. The fixing piece 142, the rotation shaft 144, and the pivotal seat 128 of one of the hinge assemblies 100 are located in one of the first troughs 222a, and the fixing piece 142 is combined with the second body 220. The corresponding second troughs 222b is used for receiving the part, protruding outside the first body 210, of the slidable element 120. For example, when the first body 210 leans on the second body 220, the extension portion 126 is located in the corresponding second troughs 222b.

As shown in FIG. 11, FIG. 12, FIG. 13, and FIG. 14, the first body 210 is capable to slide between a first position P1 and a second position P2. When the first body 210 is located at the first position P1, the first body 210 approximately stacks on the second body 220 to cover the top surface 222.

Figure 15:
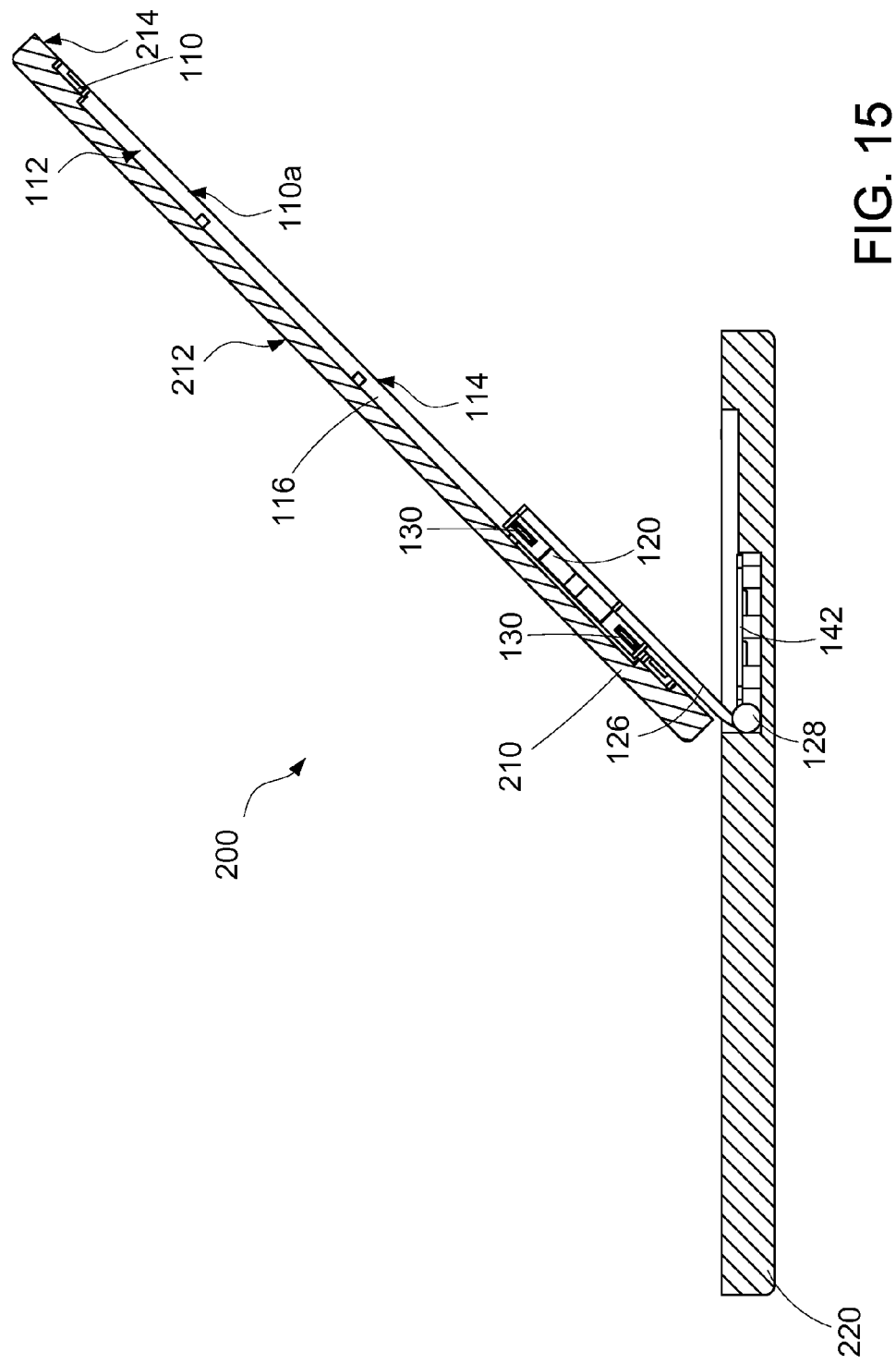

As shown in FIG. 15, when the first body 210 is located at the second position P2, the first body 210 is capable to rotate on the second body 220 to form an included angle between the first body 210 and the second body 220.

As shown in FIG. 11 and FIG. 12, the second body 220 further includes a plurality of positioning bumps 227. In each elongated slot 218, at least two positioning bumps 227 are disposed on the inner wall of the elongated slot 218 and corresponding to one of the positioning member 150 of the hinge assembly 100. When the first body 210 is located at the first position P1, one of the positioning bumps 227 blocks the corresponding positioning member 150, so as to stop the first body 210 moving toward the second position P2. On the contrary, when first body 210 is located at the second position P2, the other positioning bump 227 blocks the corresponding positioning member 150, so as to stop the first body 210 moving toward the first position P1.

When the first body 210 slides between the first position P1 and the second position P2, even if the force pushes the first body 210 is not in parallel to the moving direction of the guiding assembly, by the rolling of the main rolling members 130, a low friction between the slidable element 120 and guiding rail 110 or between the slidable element 120 and the inner wall of elongated slot 218 can be remained so as to make the first body 210 slide smoothly. The main rolling members 130 also compensate for tolerance between the slidable element 120 and the inner wall or tolerance between the slidable element 120 and the guiding rail 110, so as to prevent the slidable element 120 for moving transversely. Furthermore, each slidable element 120 is equipped with at least two main rolling members 130 to avoid the frictional force applied on the slidable element 120 from raising result from that the slidable element 120 biased away from the moving direction and partially contacting with the inner wall and/or the guiding rail 110.

The structure of the hinge assembly 100 proposed in this disclosure is simple, and is capable to be assembled outside the first body 210 and the second body 220. Components of the hinge assembly 100 proposed in this disclosure are not required to be pre-installed into the first body 210 or the second body 220 in advance, such that the assembling process for the slide-type electronic device 200 is simplified. The main rolling members 130 compensate for tolerance, so as to prevent the slidable element 120 from moving transversely on the guiding rail 110 to raising frictional force.

Figure 16:
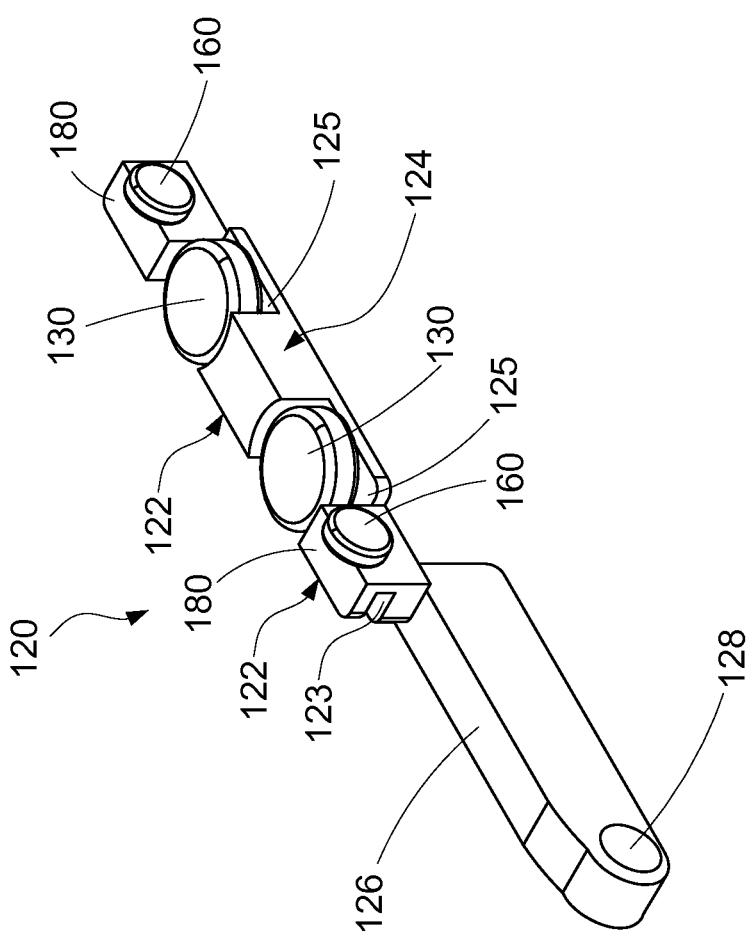
FIG. 16 is the perspective view of a slidable element according to a second embodiment.

Please refer to FIG. 16, in which a slidable element 120 according to a second embodiment is shown. The slidable element 120 further includes at least two auxiliary rolling members 160, disposed on the slidable element 120 in a rotatable manner. And the slidable element 120 in this embodiment is modified according to the auxiliary rolling members 160.

The slidable element 120 of the second embodiment further includes two depressions 125, for receiving the two main rolling members 130. And at least part of each main rolling member 130 protrudes on the guiding surface 124 for contacting with the inner wall of the elongated slot 21; or at least part of each main rolling member 130 protrudes on the sliding surface 122 for contacting with the guiding rail 110. In the second embodiment, each main rolling member 130 protrudes on the sliding surface to contact with the other part of the guiding rail 110 and is not located in the chute 123. Two roller seats 180 are respectively disposed to two ends of the slidable element 120, and the two auxiliary rolling members 160 are disposed to the two roller seats 180 in a rotatable manner. The rotation axis of each auxiliary rolling member 160 is perpendicular to the rotation axes of the main rolling members 130. And at least part of each auxiliary rolling member 160 protrudes on the slidable element 120 and extends toward the first body 210 to contact with the bottom of the elongated slot 218. The auxiliary rolling members 160 compensate for tolerance between the slidable element 120 and the elongated slot 218, and the auxiliary rolling members 160 compensate for the tolerance between the chute 123 and the guiding rail 110, so as to prevent the slidable element 120 from moving up-and-down. Furthermore, each slidable element 120 is equipped with two auxiliary rolling members 160 to avoid the frictional force applied on the slidable element 120 from raising result from that the slidable element 120 biased away from the moving direction and partially contacting with the bottom of the elongated slot 218.

While the present invention has been described by the way of example and in terms of the embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A hinge assembly having linear movement, comprising:
   a guiding rail, comprising a first side surface and a second side surface opposite to each other, wherein the guiding rail further comprises a first edge and a second edge opposite to each other and in parallel to the longitudinal direction of the guiding rail;
   at least one protruding block, disposed on the first side surface and near the second edge, wherein the width of the protruding block is smaller than the width of the first side surface, such that a gap exists between the protruding block and the first edge;
   a slidable element, comprising a sliding surface and a guiding surface opposite to each other, wherein a chute having two open ends is formed on the sliding surface, and the first edge of the guiding rail inserts into the chute, such that the slidable element is capable to slide along the first edge;

a rotatable element, pivoted to the slidable element to rotate on the slidable element; and at least two main rolling members, combined with the slidable element in a rotatable manner, and at least part of each main rolling member protruding on the guiding surface or the sliding surface, wherein at least part of each main rolling member contacts with the first edge of the guiding rail.

2. The hinge assembly as claimed in claim 1, wherein each of the main rolling members is a roller and a rotation axis of each roller is perpendicular to the first side surface.

3. The hinge assembly as claimed in claim 2, wherein each of the main rolling members is located inside the slidable element and two openings are formed on the guiding surface, such that the two main rolling members protrude on the guiding surface via the two openings respectively.

4. The hinge assembly as claimed in claim 2, wherein at least part of each of the main rolling members protrudes into the chute.

5. The hinge assembly as claimed in claim 2, wherein the slidable element further comprises two depressions for receiving the two main rolling members with at least part of each main rolling member protruding on the guiding surface or the sliding surface.

6. The hinge assembly as claimed in claim 2, further comprising at least two auxiliary rolling member disposed to the slidable element in a rotatable manner, wherein a rotation axis of each of the auxiliary rolling member is perpendicular to the rotation axis of one of the main rolling members, and at least part of each of the auxiliary rolling members protrudes outside the slidable element.

7. The hinge assembly as claimed in claim 6, wherein two roller seats are respectively disposed to two ends of the slidable element, and the two auxiliary rolling members are respectively disposed to the two roller seats in a rotatable manner.

8. The hinge assembly as claimed in claim 2, wherein the slidable element further comprising an extension portion, a pivotal seat is disposed to the extension portion, the rotatable element comprises a fixing piece and a rotation shaft, and the rotation shaft is disposed on the fixing piece and pivoted to the pivotal seat.

9. The hinge assembly as claimed in claim 1, further comprising a positioning member disposed on the guiding surface in a protruding manner.

10. The hinge assembly as claimed in claim 9, wherein the positioning member is a reed bent and disposed on the guiding surface, and the bent part of the reed protrudes on the guiding surface.

11. A slide-type electronic device, comprising:
a first body, having a front surface and a back surface;
a second body, having a top surface; and
at least one hinge assembly for combining the first body with the second body, and the hinge assembly comprising:
a guiding rail, combined with the first body, and comprising a first side surface and a second side surface opposite to each other; wherein the first side surface faces the first body and is spaced from the first body, and the guiding rail further comprises a first edge and a second edge opposite to each other and in parallel to a longitudinal direction of the guiding rail respectively;
at least one protruding block, disposed on the first side surface and near the second edge, wherein the width of the protruding block is smaller than the width of the first side surface, such that a gap exists between the protruding block and the first edge, and the at least one protruding block is used to be combined with the first body;
a slidable element, comprising a sliding surface and a guiding surface opposite to each other, wherein a chute having two opening ends is formed on the sliding surface and the first edge of the guiding rail inserts into the chute to slide the slidable element along the first edge;
a rotatable element combined with the second body and pivoted to the slidable element to rotate on the slidable element; and
at least two main rolling members, combined with the slidable element in a rotatable manner, and at least part of each main rolling member protruding on the guiding surface or the sliding surface, wherein at least part of each main rolling member contacts with the first edge of the guiding rail.

12. The slide-type electronic device as claimed in claim 11, wherein a display screen is disposed on the front surface.

13. The slide-type electronic device as claimed in claim 11, wherein at least one elongated slot is formed on the back surface of the first body for accommodating the guiding rail.

14. The slide-type electronic device as claimed in claim 13, wherein the width of the guiding rail is smaller than the width of the elongated slot, and a gap exists between the first edge and an edge of the elongated slot.

15. The slide-type electronic device as claimed in claim 14, wherein each of the main rolling members protrudes outside the chute to contact with the first edge of the guiding rail.

16. The slide-type electronic device as claimed in claim 14, further comprising a positioning member disposed on the guiding surface in a protruding manner, the second body comprises a plurality of positioning bumps disposed on an inner wall of the elongated slot and corresponding to the positioning member.

17. The slide-type electronic device as claimed in claim 11, further comprising at least two auxiliary rolling member, disposed on the slidable element in a rotatable manner, wherein a rotation axis of each of the auxiliary rolling members is perpendicular to rotation axes of the main rolling members, and at least part of each of the auxiliary rolling members protrudes outside the slidable element to contact with the bottom of the elongated slot.

18. The slide-type electronic device as claimed in claim 11, wherein the slidable element partially protrudes outside the first body.

19. The slide-type electronic device as claimed in claim 18, wherein the slidable element comprises an extension portion located outside the first body; wherein a pivotal seat is disposed to the extension portion, the rotatable element comprises a fixing piece and a rotation shaft, the fixing piece is combined with the second body, and the rotation shaft is disposed on the fixing piece and pivoted to the pivotal seat.

20. The slide-type electronic device as claimed in claim 19, wherein at least one first trough is formed on the top surface of the second body, and the fixing piece, the rotation shaft, and the pivotal seat are located in the first troughs.

21. The slide-type electronic device as claimed in claim 20, wherein at least one second trough is formed on the top surface of the second body, the second trough communicates with one of the first troughs, and the second trough is used for receiving the part, protruding outside the first body, of the slidable element.

* * * * *